May 2, 1950          J. C. MURPHY          2,506,233
METAL REPAIR KEY
Filed Aug. 23, 1945
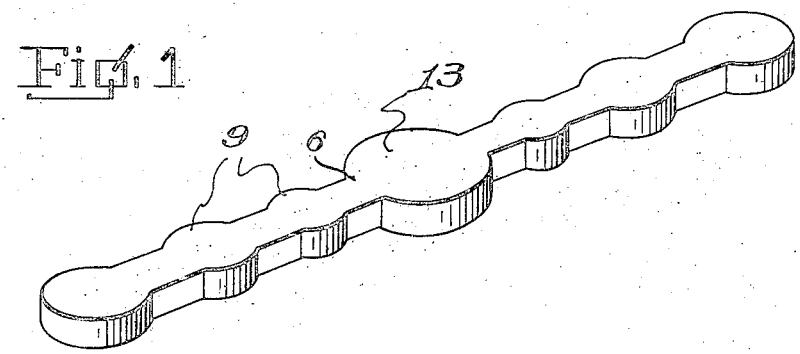
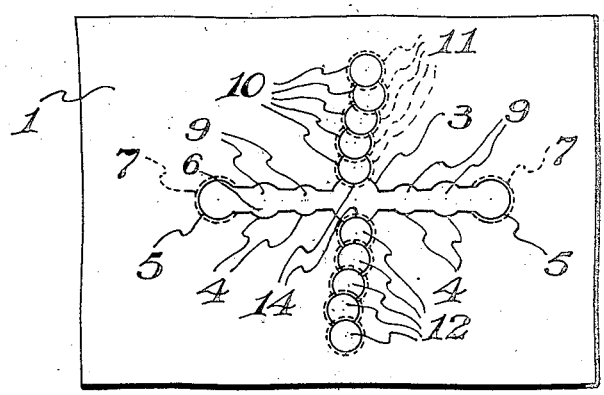
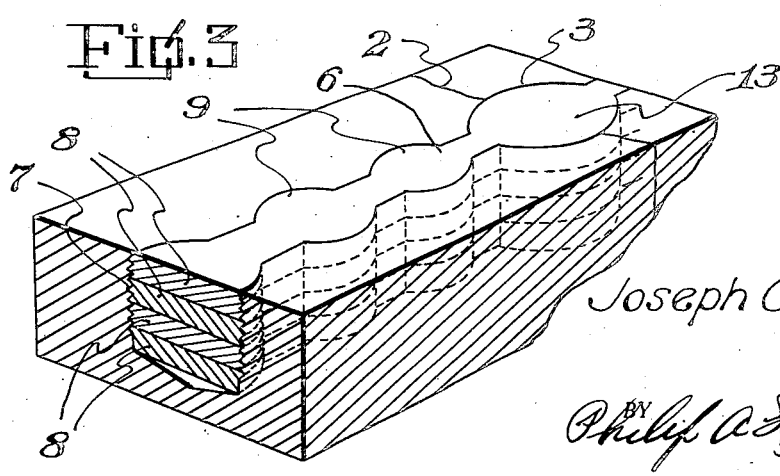
Joseph C. Murphy
INVENTOR.
Philip A. T. Terrell
ATTORNEY.

Patented May 2, 1950

2,506,233

UNITED STATES PATENT OFFICE 2,506,233

METAL REPAIR KEY

Joseph C. Murphy, Tulsa, Okla.

Application August 23, 1945, Serial No. 612,281

3 Claims. (Cl. 189—36)

The invention relates to metal repair keys for repairing cracks in castings and the like, and has for its object to provide a device of this character having spaced bulges with threaded anchoring means in the holes in which the end bulges are disposed, and into which threaded holes the end bulges are swaged for interengagement with the thread, thereby securely anchoring the ends of the key against curling, as the various bulges are swaged into closed engagement with their casting holes.

A further object is to provide the key with a central bulge larger than the other bulges and adapted to straddle the crack, and to be interengaged with the lacing studs following the line of the crack, thereby providing maximum strength at the point of interengagement with the lacing studs, and preventing spreading of the crack.

A further object is to apply the lacing studs along the crack by first drilling holes in overlapping relation with the central bulge of the key, tapping said holes and threading studs therein and smoothing off the outer ends of the studs so placed; then drilling the next hole in overlapping relation to the previously studded hole, then threading the same and threading a stud therein and continuing the above operation to the outer ends of the crack.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:

Figure 1 is a perspective view of the cross key.

Figure 2 is a top plan view of a casting showing the cross key and the lacing.

Figure 3 is a detail perspective view of a portion of a casting showing the laminated cross key therein.

Referring to the drawing, the numeral 1 designates a portion of a casting and 2 a crack therein to be repaired. In the repair operation a central large hole 3 is drilled and then spaced holes 4 and 5 are drilled, increasing in diameter towards the outer end of the cross or tie key 6. The outer holes 5 are then threaded as at 7 and following this operation, the various keys 8 are placed in position to form a laminated key. The lower key 8 is first placed in position and swaged with a punch or the like to expand the same, in the threads 7, and then the next key is placed in position and swaged at its outer ends into locking engagement with the threads 7, however as each key is placed in position its bulges 9 are swaged, following the swaging of the end bulges, hence it will be seen that the outer ends of the keys will not curl upwardly as the inner bulges are swaged into engagement with the recesses 4, and the metal will be drawn and there will be a tendency to pull the crack 2 together.

Following the positioning of the laminated key the inner holes 10 are drilled on opposite sides of the bulge 13 in overlapping relation to said bulge at 14 and the holes so drilled are then tapped at 11 for the reception of the inner threaded studs 12. After the positioning of the inner studs the next holes are drilled and threaded in overlapping relation to the previously drilled and studded holes. The above process continues to the outer ends of the crack. By drilling, studding, drilling and studding in the above order, an overlapping threaded interengagement is obtained and the drilling operation is made possible as the drill bit will not be deflected sidewise by the interconnecting holes, nor will the tap be broken by engagement with a sharp corner where the holes interconnect, which would be the case were all the holes drilled and then studded.

It will be noted that the hole 3, described as larger, receives a central enlarged bulge 13 of the cross keys 8, therefore there is additional metal provided across the crack to compensate for the portion drilled out at 14 in opposite sides of the various bulges 13. In this manner the interengaging of the inner lacing studs 12 with the bulge 13 will not weaken the cross key 6, as the portions 13 of the keys are of greater width between the roots of the thread inner studs 12 than at any other part of the cross keys.

From the above it will be seen that a repair key is provided for cracks in castings and the like which will positively not curl during the various swaging operations, and one wherein the center of the key is of equal transverse area to any of the transverse areas of the key at the point where the drilling takes place for the lacing studs. It will also be seen that all of the studs are locked in position by their thread and interlocked with each other by their threads.

The invention having been set forth, what is claimed as new and useful is:

1. A repair key for metal cracks, said key having an enlarged central bulge and smaller bulges on opposite sides of the central bulge to the end of the key, said bulges being connected together by restricted portions, said key being disposed in a similarly shaped recess in the cracked material and extending across the crack, the outer ends of the recesses being threaded, the outer ends of the key being swaged and spread into interengagement with the threaded outer ends, overlapped lacing studs on opposite sides of the key, the inner lacing studs extending into recesses in opposite sides of the enlarged central bulge of the key, the distance between the roots of the thread of the inner lacing stud being greater than the distance between the outer sides of opposite bulges of the key adjacent the central bulge of the key.

2. A device as set forth in claim 1 wherein the lacing studs have threaded engagement with each other and with the casting.

3. A device as set forth in claim 1 wherein the key is formed from a plurality of laminations.

JOSEPH C. MURPHY.

REFERENCES CITED

The following references are of record in the file of this patent:

UNITED STATES PATENTS

| Number    | Name    | Date           |
|-----------|---------|----------------|
| 2,011,484 | Harman  | Aug. 13, 1935  |
| 2,195,741 | Scott   | Apr. 2, 1940   |
| 2,198,167 | Harman  | Apr. 23, 1940  |
| 2,278,334 | Scott   | Mar. 31, 1942  |
| 2,291,162 | Kirby   | July 28, 1942  |
| 2,321,629 | Scott   | June 15, 1943  |
| 2,361,701 | Michaels| Oct. 31, 1944  |
| 2,415,905 | Overton | Feb. 18, 1947  |